United States Patent
Wiacek, Jr.

(10) Patent No.: US 8,862,887 B1
(45) Date of Patent: Oct. 14, 2014

(54) PROVIDING USER CONTRIBUTIONS FOR RE-PUBLISHED CONTENT

(75) Inventor: Michael Joseph Wiacek, Jr., Mountain View, CA (US)

(73) Assignee: Google Inc., Mountain View, CA (US)

( * ) Notice: Subject to any disclaimer, the term of this patent is extended or adjusted under 35 U.S.C. 154(b) by 171 days.

(21) Appl. No.: 13/494,937

(22) Filed: Jun. 12, 2012

(51) Int. Cl.
   *H04L 29/06* (2006.01)

(52) U.S. Cl.
   USPC ............... 713/176; 726/26; 726/30; 709/224; 705/51

(58) Field of Classification Search
   USPC .......... 713/176; 726/26, 30; 709/224; 705/51
   See application file for complete search history.

(56) References Cited

U.S. PATENT DOCUMENTS

| | | | |
|---|---|---|---|
| 6,052,717 A * | 4/2000 | Reynolds et al. | 709/218 |
| 7,877,460 B1 | 1/2011 | Brouwer et al. | |
| 2007/0106627 A1 * | 5/2007 | Srivastava et al. | 706/20 |
| 2010/0004944 A1 | 1/2010 | Palaniappan | |
| 2010/0125738 A1 * | 5/2010 | Chang et al. | 713/182 |
| 2010/0153364 A1 * | 6/2010 | Kirby | 707/722 |
| 2010/0205221 A1 * | 8/2010 | Shaw et al. | 707/802 |
| 2011/0219076 A1 | 9/2011 | Roope et al. | |
| 2012/0005209 A1 | 1/2012 | Rinearson et al. | |
| 2012/0124381 A1 * | 5/2012 | Kim | 713/176 |
| 2013/0024788 A1 * | 1/2013 | Olsen et al. | 715/753 |
| 2013/0080776 A1 * | 3/2013 | Elduff | 713/168 |
| 2013/0159887 A1 * | 6/2013 | Whitmyer, Jr. | 715/760 |
| 2013/0166565 A1 * | 6/2013 | Lepsoe | 707/740 |
| 2013/0275857 A1 * | 10/2013 | Norwood et al. | 715/234 |
| 2014/0122622 A1 * | 5/2014 | Castera et al. | 709/206 |

* cited by examiner

*Primary Examiner* — Christopher Revak
*Assistant Examiner* — Sarah Su
(74) *Attorney, Agent, or Firm* — IP Spring

(57) ABSTRACT

In one embodiment, a method for providing user contributions for shared content on a network includes receiving content at a network system for publication on the network system where content is not currently being published. The method determines that the content is associated with one or more stored previous user contributions that were contributed by one or more users of a previous network system and previously published with the content on the previous system. The previous user contributions are obtained, and the content and the previous user contributions are published on the network system to allow access by users of the network system.

18 Claims, 5 Drawing Sheets

PROVIDING USER CONTRIBUTIONS FOR RE-PUBLISHED CONTENT

BACKGROUND

Social network systems and services have become increasingly popular for use over wide-area computer networks such as the Internet. A user of a social network system can upload and post content which can become shared content by allowing one or more users of the system to access the content. For example, the content can be photographs or other images, video data, audio data, documents or other text, etc. The uploading user can also remove the content and/or upload the content to other network systems. In many social network systems, other users of the system can contribute their own content to the shared content, such as ratings of the shared content, comments, tags, or messages relating to the shared content, additions or edits to the content, and so on. These contributions from users can become an important and valuable addition to the original uploaded content.

SUMMARY

Embodiments of the present application relate to user contributions for re-published content. In some embodiments, a method for providing user contributions for shared content on a network includes receiving content at a network system for publication on the network system where content is not currently being published. It is determined that the content is associated with one or more stored previous user contributions that were contributed by one or more users of a previous network system and previously published with the content on the previous network system. The previous user contributions are obtained, and the content and the previous user contributions are published on the network system to allow access by users of the network system.

In various embodiments of the above method, the previous network system can be a different network system or the same network system as the network system. The content can be received as an upload at the network system from a user, and the previous user contributions can be received at the network system in a contribution packet of information. In some embodiments, the contribution packet is embedded in the uploaded content. The contribution packet can be signed with a cryptographic signature, which can be validated before publishing the user contributions is allowed. The method can include checking for at least one permission associated with the previous user contributions from the previous network system to allow the network system to publish the previous user contributions. Obtaining the previous user contributions can include retrieving the previous user contributions from storage accessible to the network system, where the previous user contributions were previously received over a communications network from a different network system. The previous user contributions can be verified to be authentically associated with the content. Determining association with previous user contributions can include creating a new fingerprint derived from the uploaded content, checking whether the new fingerprint matches one or more old fingerprints derived from previous content previously published, and determining that one of the old fingerprints matches the new fingerprint. The fingerprints can be based on one or more characteristics of the associated content, or based on a hash of at least a portion of the associated content. The previous user contributions can include user ratings of the content, user comments associated with the content, and/or tags associated with the content. In some embodiments, prior to the receiving content at the network system, a previous network system receives a request from a user to download the published content, the previous user contributions are cryptographically signed, and the content and the previous user contributions are sent to a client device of the user.

In some embodiments, a method for providing user contributions for shared content on a network includes receiving uploaded content from a first user at a social network system for publication to one or more users on the social network system where the uploaded content is not currently being published. One or more stored previous user contributions are obtained, which are associated with and previously applied to the uploaded content. The previous user contributions were contributed by one or more other users of a different social network system, and the user contributions were previously published with the uploaded content to one or more users on the different social network system. It is verified that the previous user contributions are authentically associated with the uploaded content and have not been altered since their previous publication. The uploaded content and the previous user contributions applied to the uploaded content on the social networking system such that the uploaded content and the user contributions can be accessible by one or more users of the social network system.

In some embodiments, a system for providing user contributions for shared content on a network includes a storage device and at least one processor accessing the storage device and operative to perform operations. The operations include receiving content at a network system for publication on the network system where the content is not currently being published. The content is determined to be associated with one or more stored previous user contributions that were contributed by users of a previous network system and previously published with the content on the previous network system. The previous user contributions are obtained, and the content and the previous user contributions are published on the network system to allow access by one or more users of the network system.

Some embodiments of the system can include operations of receiving the previous user contributions at the network system in a contribution packet of information that has been uploaded by the user with an upload of the content to the network system. The contribution packet can be signed with a cryptographic signature, and the cryptographic signature can be validated before the user contributions are allowed to be published. Further operations can include verifying that the previous user contributions are authentically associated with the content. Determining association with previous user contributions can include creating a new fingerprint derived from the uploaded content, checking whether the new fingerprint matches one or more old fingerprints derived from previous content previously published, and determining that one of the old fingerprints matches the new fingerprint. The previous user contributions can include user ratings of the content, user comments associated with the content, and/or tags associated with the content.

DETAILED DESCRIPTION

One or more embodiments described herein relate to providing user contributions for re-published content accessible on network systems such as social networks. User contributions such as comments, ratings, or other information were made by users on the network system and associated with published or shared content on the system. These contributions can be maintained or be made portable for content that is re-uploaded or otherwise re-published at the same or different network system. For example, a user can upload the content to a different social network system and the previous user contributions made at a previous network system can be associated with the re-uploaded content at the different system. Permissions can allow the participating social network systems to control the distribution of user contributions. In other embodiments, a user can instruct the system to remove shared content and associated previous user contributions, then at a later time can re-upload the same content to the same system and indicate that the previous user contributions be re-applied to the content.

Embodiments described herein allow previous user contributions to shared content to be re-published with later publications of that shared content. This allows desired, valuable and/or important contributions made during one publication of shared content to be retained and associated with that shared content for later publications on the same or different social network system.

Methods and systems are described herein associated with particular implementations. However, one of ordinary skill in the art will recognize that these methods and systems will operate effectively in other implementations.

Figure 1:
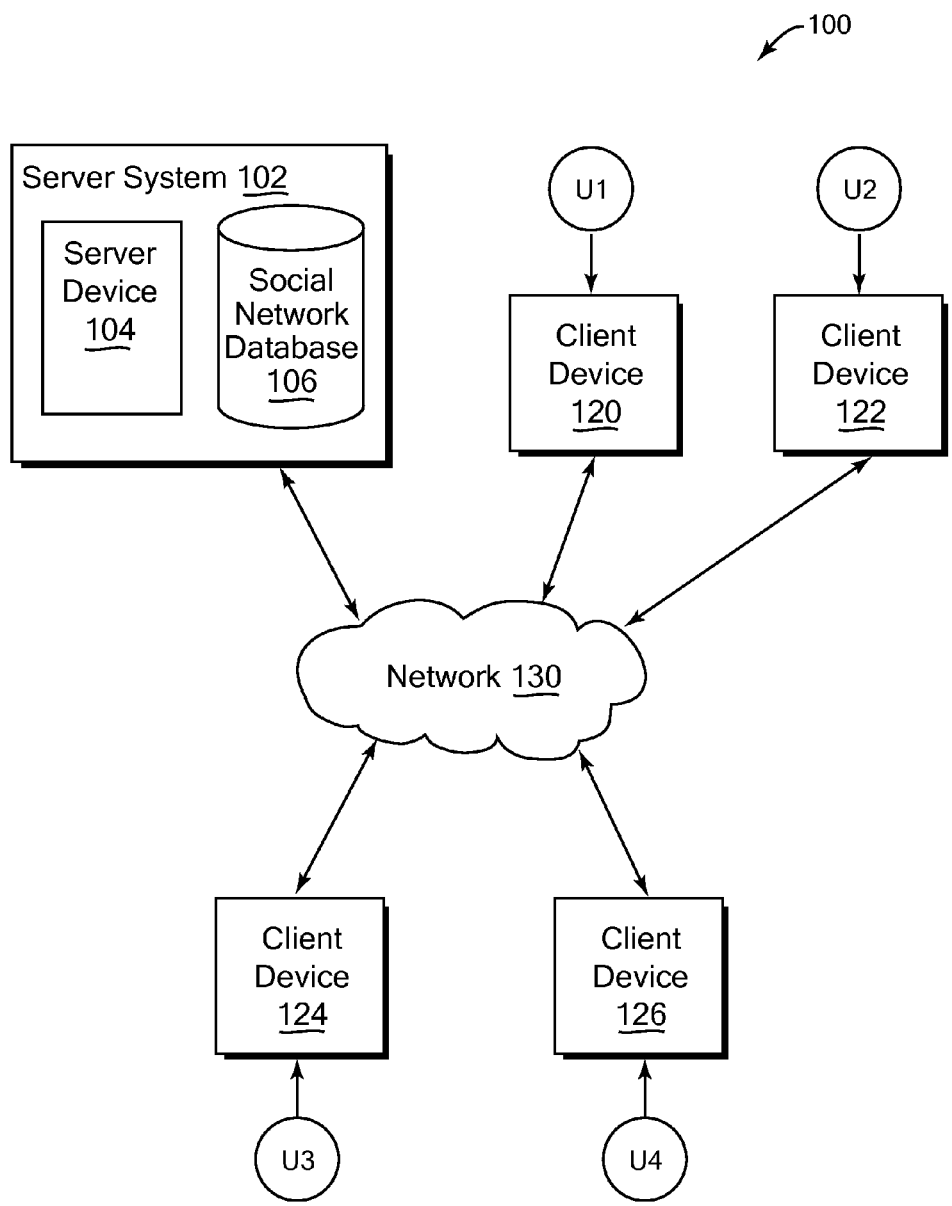
FIG. 1 is a block diagram of an example network environment which may be used for one or more embodiments described herein.

FIG. 1 illustrates a block diagram of an example network environment 100, which may be used in some embodiments to implement one or more features described herein. In some embodiments, network environment 100 includes one or more server systems, such as server system 102 in the example of FIG. 1. Server system 102 can communicate with a network 130, for example. Server system 102 can include a server device 104 and a social network database 106 or other storage device. Network environment 100 also includes one or more client devices, such as client devices 120, 122, 124, and 126, which may communicate with each other via network 130 and server system 102. Network 130 can be any type of communication network, including one or more of the Internet, local area networks (LAN), wireless networks, switch or hub connections, etc.

For ease of illustration, FIG. 1 shows one block for server system 102, server device 104, and social network database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, social network database 106 and/or other storage devices can be provided in server system block(s) that are separate from server device 104 and can communicate with server device 104 and other server systems via network 130. Also, there may be any number of client devices. In other embodiments, network environment 100 may not have all of the components shown and/or may have other elements including other types of elements instead of, or in addition to, those described herein.

In various embodiments, end-users U1, U2, U3, and U4 may communicate with the server system 102 and with each other using respective client devices 120, 122, 124, and 126, and respective to features described herein each user can send and receive content or contributions via a social network system implemented by network system 100. In one example, users U1, U2, U3, and U4 may interact with each other via the social network system, where respective client devices 120, 122, 124, and 126 transmit data to one or more server systems such as system 102, and the server system 102 provides appropriate data to the client devices such that each client device can receive and contribute to shared content uploaded to the social network system via the server system 102.

The social network system can be any system allowing users to perform a variety of communications, form links and associations, upload, publish, and contribute to shared content, and/or perform other socially-related functions. For example, the social network system can allow a user to send messages to particular or multiple other users, form social links in the form of associations to other users within the social network system, group other users in user lists, friends lists, or other groups, post content including text, video, audio, or other types of content for access by users of the social network system, contribute additional content or information to shared content posted by themselves or other users, send multimedia information and other information to other users of the social network system, participate in live video, audio, and/or text chat with other users of the system, etc. As used herein, the term "social network system" can include a software and/or hardware system that facilitates user interactions, and can include a service implemented on a network system. A "social link" is any link between multiple users that allows these users to more easily communicate, find statuses of the other users, and/or otherwise relay information between each other. For example, adding another user to a first user's group of known users is adding a social link between these users. In some embodiments, a "user" can include one or more programs or virtual entities, as well as persons that interface with the system or network.

For example, a user can upload content from a client device 120, 122, 124, or 126 to the server system 102, and then publish or share the content as shared content. The content can be any type, such as text, audio sequences, video sequences, graphical photos or other images, etc. The sharing of the content allows other users of the social network system to access and, in some cases, contribute to the shared content. For example the uploading user can designate one or more user groups, such as "friends lists" or "circles," to allow users in the designated user groups to access and/or contribute to the shared content. Each user group specifies one or more users of the social network system. For example, the user can designate that the users in one user group can access (e.g., receive and view the content on their client devices) and contribute content to (e.g., post ratings, comments, or additional content) the shared content. In some embodiments, the user may be able to designate access and contribution levels independently, e.g., a particular set of users can access the content and a different set or subset of users can contribute content to the shared content. A social networking interface including features described herein can be displayed using software on each client device, such as application software or client software in communication with the server system. The interface can be displayed on an output device of the client device, such as a display screen. For example, in some embodiments the interface can be displayed using a particular standardized format, such as in a web browser or other application as a web page provided in Hypertext Markup Language (HTML), Java™, JavaScript, Extensible Markup Language (XML), Extensible Stylesheet Language Transformation (XSLT), and/or other format.

Other embodiments can use other forms of network systems instead of social network systems. For example, a set of users using any computer network can make use of features described herein.

Figure 2:
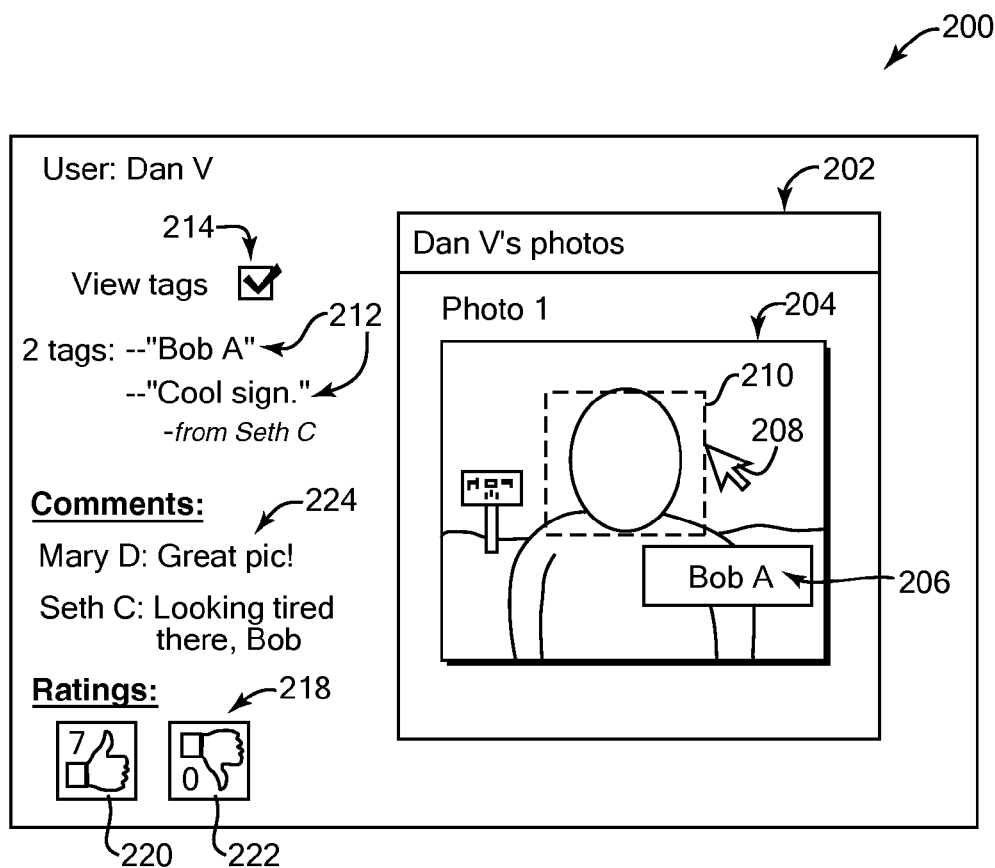
FIG. 2 is illustration of an example graphical user interface (GUI) displaying content and user contributions on a network system according to one embodiment.

FIG. 2 is a diagrammatic illustration of an example simplified graphical interface (GUI) 200 displaying shared content and user contributions on a network system according to one embodiment. GUI 200 can be displayed on a display device, e.g., of a client device 120, 122, 124, and/or 126, or a server system 102 in some embodiments. For example, the GUI 200 can be downloaded from the server system 102 for display on a client device in a web browser or other application program. The interface 200 includes one or more displayed windows within the GUI, or can be displayed in other forms in other embodiments.

In one embodiment, GUI 200 includes a content window 202, which in the described example of FIG. 2 shows a user's uploaded content in the form of photos. The user "Dan V" has uploaded the photo 204 to his account or user profile of the social networking system implemented on server system 102. In this example, the photo 204 depicts another user of the social networking system. Furthermore, a user has added referring information to the photo 204, which in this example identifies the depicted user by taking the form of a tag that includes the name of the user depicted, "Bob A." In some embodiments, the tag can be displayed as tag 206 when a user viewing the GUI 200 moves a cursor 208 over a selection area 210 defined within the photo 204. The tag can also be displayed as text 212 to the side of the photo 204 if the viewing user has selected the option 214 to view tags there. Various other embodiments can display tags or other referring information in other forms. In some embodiments, the tag 206 and/or 212 can also be links to the tagged user's profile or information. This allows the user to select one of the tags 206 and 212 to cause the tagged user's profile or other information about the tagged user to be displayed. Some embodiments allow only the uploading or controlling user to add tags 206 and 212, while other embodiments or settings can allow other users to add tags or other types of identifying information or descriptions to the content 204.

GUI 200 can also display other information related to and associated with the displayed content 204, such as user contributions from one or more users of the social network system. In some embodiments, the user contributions can be stored on the server system 104 with the associated shared content. For example, in some embodiments, user contributions that are ratings 218 can be displayed. The ratings 218 can be provided by users of the social network system regarding the content 204. For example, "thumbs-up" or positive ratings 220 can indicate how many other users have given a positive rating to the content, and "thumbs-down" or negative ratings 222 can indicate how many other users have given a negative rating to the content. Other ratings can be used in other embodiments, including additional levels of positive and negative ratings, text description ratings, etc.

In some embodiments, contributions such as user comments 224 can be displayed and associated with the shared content 204. User comments 224 are contributed by one or more users of the social network system, and in some cases an identification of the user who contributed the comment is also displayed. Comments can be provided as text as shown, and/or other types of content such as images, video, audio, links to other users, geographical locations, etc. In some embodiments, each user comment can include a link to the user commenting, such as a link to that user's profile or other information.

Other embodiments can include alternative or additional user contributions, such as additional content that is added to the content 204. For example, in some embodiments other users can add tags similar to tags 206 and 212. Some embodiments can allow users to add one or more additional content pieces to the content 204, e.g., an additional photo to be displayed alongside or within the photo 204. Some embodiments can allow users to edit the content 204 itself as contributions, such as by adding drawing lines, shapes or colors to the photo 204, adding text to text content, adding voiceovers or sound effects to audio content, etc. In some embodiments these edits can be maintained separately from the content so that the original content can be restored without all or a subset of the edits, if desired.

Figure 3:
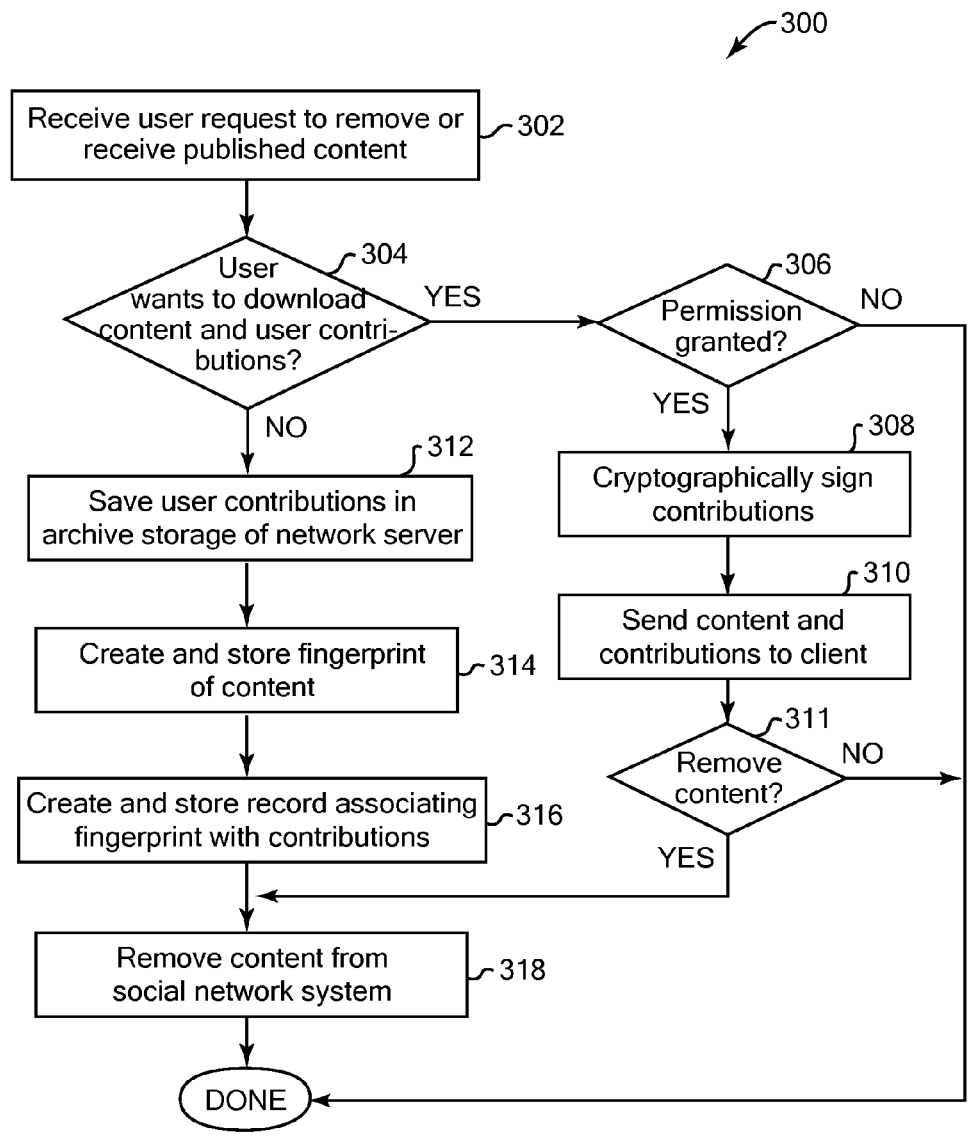
FIG. 3 is a flow diagram illustrating an example method of providing user contributions for content removed or sent from a network system, according to one embodiment.

FIG. 3 is a flow diagram illustrating one example of a method 300 of providing user contributions for shared content removed or sent from a network system, according to one embodiment. In some embodiments, method 300 (and method 400, below) can be implemented, for example, on a server system 102 as shown in FIG. 1. In described examples, the server system includes one or more processors or processing circuitry, and one or more storage devices such as a database 106. In some embodiments, different components of a server and/or different servers can perform different blocks or other parts of the method 300. In other embodiments, some or all of the method 300 can be implemented on one or more client devices. Method 300 can be implemented by program instructions or code, which can be implemented by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. Alternatively, these methods can be implemented in hardware (logic gates, etc.), or in a combination of hardware and software. The method 300 can be provided as part of or component of an application running on the client device, or as a separate application or software running in conjunction with other applications and operating system.

In block 302, a user request is received by the system to remove or receive shared (published) content. The shared content constitutes data and can be any type of content, such as text, image, video, audio, olfactory, tactile, or a combination of these or other types. In some embodiments, the content can include other information such as geographical locations at which one or more users of the network system are currently or recently located, map information, graphs, biometric information, etc. The content is stored on one or more storage devices accessible to the social network system, such as on the social network database 106. The content can be associated with a particular controlling user who may have uploaded or otherwise obtained the content and who has control over the content on the network system. For example, the content may be stored in the controlling user's profile or account.

The controlling user can "publish" the content on the social network, i.e., share the content with or with one or more users of the social network. The published or shared content is accessible by one or more users of the network system. For example, the users who can access the published content can be determined or selected by the user controlling the content. In one example, these users can be designated by the controlling user by selecting a privacy level setting or user access setting or designation for the particular content or for all content in that user's account or profile. For example, the user access can be set to be the controlling user's group of "friends," "family," "acquaintances," or specific user group, or can be all users on the network system ("public").

The users having access to the content can make contributions to the base content that was originally uploaded by the controlling user (or uploaded by a different user or otherwise obtained). The controlling user and other users having access can add contributions to the content. Thus, the published content can include the original image, document, audio file, video sequence, or other content type uploaded by the controlling user, and the contributions are additional content later added by one or more users of the network system. The contributions can provide a record or history of user activity related to the published content. The contributions from other users besides the controlling user are typically added after the content was first published to other users on the network system. Contributions can include additional content from the controlling user added before or after publication on the network system. For example, the additional content can include comments, ratings, and or messages pertaining to the content, tags, identifiers, or links added to features of the content or to other contributions for the content, or edits made to the content or made to other contributions for the content. Some examples of user contributions are described above with reference to FIG. 2. Both the content and the contributions can be shared to allow the same level of user access. In other embodiments, the contributions can have a different user access than the content. For example, the content can be accessible by one set of users, while each contribution can be accessible by a different set of users as based on user preferences or other conditions.

The user request received in block 302 can be provided by the controlling user who has control over the content, e.g., the user who originally uploaded or posted the content using his or her account or user profile of the network system. In other embodiments, the received request can be provided by a different user of the network system who has the ability to remove or download the content.

In block 304, the process checks whether the requesting user wants to download the content and the user contributions. For example, the controlling user (who may be the user who uploaded the content to the network system) may have requested in block 302 to download the content to the client device of the controlling user. In some examples, downloading may be requested if the requesting user wishes to use the content at local devices such as the client device, or the user wishes to upload the content to a different network system. The requesting user also has the option of requesting the user contributions associated with the content to be downloaded, and can indicate in the received request of block 302 whether or not the user contributions are also being requested for download.

If the user request is for downloading the content and the user contributions, then the process can continue to block 306 in which it is checked whether the downloading user has been granted permission to download the content and/or contributions from the social networking site and, in some embodiments, whether the user has been granted permission to upload the content and/or contributions to a different social networking site. For example, some embodiments require the user to request such permission(s) and receive a reply from the social network system before continuing a download procedure. Thus, if no permission is granted at block 306, then the process is complete. Alternatively, some embodiments can allow the user to download the content but not download any user contributions to that content if permission is not granted.

If requisite permission is granted, the process continues to block 308, in which the user contributions are cryptographically signed. The cryptographic signature ensures that, when the contributions are received and decoded, the contributions are the same and authentic as provided by the social network system and that the data has not been altered in any way since the download. For example, this is useful to ensure that a user's comments have not been changed since the download, a user's identity misappropriated for other comments, etc. In some embodiments, all the contributions for the content are collected into a "contribution packet" which is cryptographically signed (or collected into multiple contribution packets that are each signed). For example, all the comments, ratings, tags or other identifiers, links, and other contributions added to the content are collected into a packet, with any necessary references to the original content or to other content referred to by the contributions. The cryptographic signature can use any method to encode the contributions with a signature. In one example, an asymmetric encoding method is used, in which a private key is used to encrypt the user contribution packet. A public key is attached to the encoded contribution packet which is to be used in the decoding of the packet. If the public key validly decodes the packet, then it has been validated as authentic and unhampered. Some embodiments can also cryptographically sign the content to be downloaded.

In some embodiments, the cryptographic signature can further verify that these contributions are associated with the particular content downloaded. For example, the content can be associated with a key that is used in the valid decoding of the associated contributions. If a receiving system obtains the key with the content, the contributions can be validly decoded with that key and thus have been verified to be associated with that content. Other methods to associate the content and contributions can be used, such as some examples described below. In addition, in some embodiments permission data can be included in the contributions and/or associated with the cryptographic signature to indicate to any different receiving network system whether these contributions and/or content have been permitted to be downloaded and uploaded on a different system.

In block 310, the content and contributions (e.g., contribution packet) are sent to the downloading client for the requesting user. For example, the server system 102 can send the content and contributions to one of the client devices 120-126 that is associated with the requesting user. In some embodiments, the content and contributions can be sent as separate data packets, e.g., a content packet and a separate contributions packet. In some of these embodiments, the content and contributions data can be linked by a particular mechanism allowing the data to be associated with each other. For example, a hash value can be obtained from a hash function applied to the content data and contributions data, where the hash value identifies the combination of content and its associated contributions. The hash value can be included in the sent content or the contributions (if separate). In other embodiments, the contribution data can be embedded in the content to form a single packet, such that the contributions data can be later extracted from the content. For example, some forms of content can include extra metadata fields that are independent of the content data, where the user contributions can be stored as metadata of the content.

In block 311, the system checks whether the user has requested to remove the content and contributions that have been downloaded. In some cases, the user desires to delete or otherwise remove the content and the contributions from the social network system, while in other cases the user only wants to download the content and contributions and leave them on the network system. If the content and contributions are to be removed (and the user has the requisite authority to command removal), the process continues to block 318, described below. If the content and contributions are not to be removed, the process is complete. In some embodiments, the user can also request that downloaded contributions additionally be saved in archive storage of the network system, as described in blocks 312-316 of method 300. This additional archiving can be performed in the case of removing the content and contributions from the system (such that the contributions would not be accessible from the archive by users), or in the case of not removing the content from the network system.

If the user does not wish to download the content and contributions in block 304, it is assumed in simplified method 300 that the user has requested to remove the content from the network system without such download, allowing the network system to archive or maintain the contributions. (If the user has requested to download the content and not download the contributions, then the content can be sent to the user if permission has been granted; this is not shown in method 300.) In block 312 the user contributions are saved in archive storage of the network system. The archive storage can be storage that is not accessible to users of the network system, in which the contributions are stored for later retrieval. In some embodiments, the contributions can be collected into one or more contribution packets similarly as described above, and then archived in packet form. In some embodiments, the content itself can also be similarly archived before removed from access on the network system.

In block 314, a fingerprint is generated of the content that has been requested to be removed and the fingerprint is stored by the network system. The fingerprint is data derived from the content that identifies the content. In one example, the fingerprint can be a hash value of the content that is obtained using a hash function on the content, where the hash value is uniquely tied to the content. For some types of content, the fingerprint can be a digital watermark or other signature that is invisibly embedded in the content data itself and can be examined in the content using a particular method to identify the watermark and thus the content.

In another embodiment, characteristics of the content are extracted and used to identify the content. For example, for an image type of content, characteristics of objects depicted in the image can be extracted, such as image characteristics used in known image recognition and/or matching techniques to determine whether an image depicts particular objects, activities, or other features. In one example, facial characteristics used in facial recognition can be extracted and used as a fingerprint for an image depicting one or more faces. Motion recognition characteristics can similarly be extracted from video image sequences. Any of these characteristics can be extracted in block 314 as a fingerprint and used to identify a particular content image. Furthermore, some fingerprints can survive resizing or slight alteration of the content. For example, if the content is an image that is later resized to a different pixel count, a watermark fingerprint or a fingerprint of image characteristics can survive the resizing so that the resized image can still be identified by the fingerprint as equivalent to the originally-sized image.

The generated fingerprint is then stored by the network system, such as in the system archive storing the user contributions or a different storage area. In some embodiments the fingerprint can be stored in a database where the fingerprint can be searched and referenced easily for future comparisons to later uploaded content, and/or easily retrieved for sending to other network systems.

In block 316, in some embodiments a record can be created which associates the fingerprint generated in block 314 with the content itself and/or with the user contributions associated with the content that generated the fingerprint. The record can be stored in a database of the network system. For example, once a desired fingerprint is found, then the record associated with the fingerprint is consulted to find the contributions and/or content associated with the fingerprint. In some embodiments, the record can also or alternatively associate the fingerprint with other features related to the content which can be readily retrieved if necessary. Such features can include the controlling user for the content, other users who provided the contributions, the network system(s) that previously published the content, etc.

In block 318, the requested content is removed from the social network system. For example, the content is deleted and access of the content on the system is no longer possible for any user of the system. In some embodiments, the content can be removed from all user access but not actually deleted, e.g. archived in a storage area that allows recovery at a later time. The process is then complete.

Figure 4:
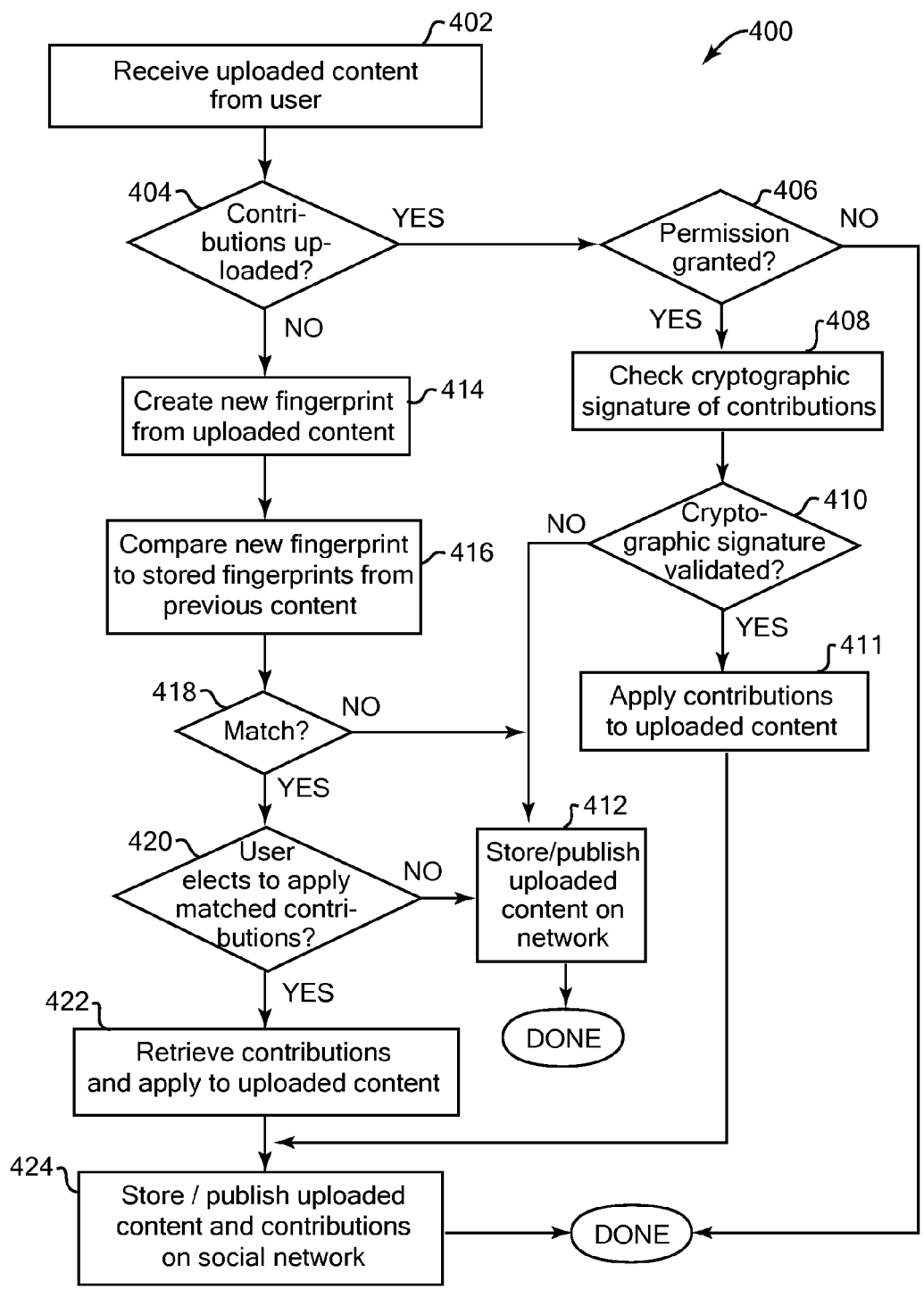
FIG. 4 is a flow diagram illustrating an example method of using previous user contributions for re-uploaded content on a network system, according to one embodiment.

FIG. 4 is a flow diagram illustrating one example of a method 400 for using previous user contributions for re-uploaded content on a network system, according to one embodiment. Method 400 can be implemented on software and/or hardware systems similarly as described for method 300 of FIG. 3.

In some embodiments, method 400 is implemented on a different network system than the network system providing or storing the previous user contributions described with reference to FIG. 3. For example, the user can download the content and user contributions using the method 300 on a first social network system, and the user can re-upload the content and user contributions on a second social network system using the method 400. In some embodiments, users of the first network system cannot access or make contributions to content provided on the second network system, and vice-versa. In some embodiments, the second, different network system has an independent set of users from the first network system. In some examples, the second network system can use different software, storage, databases, user linking system, user contribution system, and/or other features than the first network system. In other embodiments, the user contributions were stored in an archive and the content removed (or also stored in an archive) without a download. Some of these embodiments can allow the user to instruct the first network system to transfer the archived user contributions (and/or the content) to the second network system, such as over the Internet or other network 130.

In other embodiments, method 400 is implemented on the same network system that provided or stored the previous user contributions described with reference to FIG. 3. In one example, the content was removed from the social network system and the user contributions were archived in storage, and the user is then re-uploading the content to the same network system. In another example, the content and the contributions were downloaded by a user from the network system, the content and contributions were removed from the network system, and the user is re-uploading both the content and the contributions to the same network system.

In block 402, the network system receives re-uploaded content from a user. The content was previously published (shared) to one or more users on a network system and was associated with one or more user contributions that were previously made and associated with the content when it was previously shared. As described above, in block 402 the content is being re-uploaded on a different network system than the network system on which it was previously published, or is being re-uploaded on the same network system as the system on which it was previously published. In one example, the user can re-upload the content from a client device 120-126 to a server system 102. In other embodiments, the user can instruct the content to be re-uploaded from a different server system to the server system 102.

In block 404, the system checks whether associated previous contributions have been uploaded to the network system in addition to the content. In some embodiments, this can be checked by examining uploaded data to find a standardized format that can be used for user contributions. For example, user contributions can be provided in one or more contribution packets in some embodiments, or the user contributions can be embedded in the content (e.g., as metadata). The system can also or alternatively explicitly prompt or request the user to upload contributions if the user has any to upload.

If contributions have been uploaded, the process continues to block 406, in which it is checked whether the uploading user, and/or the uploaded contributions, have been granted permission by the previous network system (if any) to allow uploading of the content and/or contributions to the current network system receiving the content and contributions. For example, some embodiments require the user to have obtained such permission(s) from the previous social network system on which the content and contributions were previously stored and accessible, before those contributions can be uploaded on any other social network system. In various embodiments, the content and contributions can collectively have a single permission, or can have separate individual permissions, or only the user contributions need permission for upload. For example, in some embodiments the permission(s) can be checked in block 406 by examining or validating permission data in the uploaded contributions and/or in the uploaded content. This permission data can in some embodiments be decoded and validated in the blocks 408 and 410. In other embodiments, permission can be obtained in other ways, such as by a separate communication received by the network system from the previous network system. The communication can provide the permission to the identified content and contributions and/or to the specified uploading user. If the requisite permission is not found at block 306, then the process is complete, and the uploaded content and contributions can be deleted. Alternatively, some embodiments can allow upload of the content but not upload of the contributions if permission has not been granted, and such a process can continue to block 412.

If requisite permission has been found in block 406, the process continues to block 408, in which a cryptographic signature of the contributions is checked to validate the contributions. For example, a digital signature can be provided in encoded contributions. In some embodiments using asymmetric or public-private key encoding, a public key can be provided with the contributions (or with the uploaded content), and the system uses the public key to decode the contributions. If the contributions are validly decoded, then they have been validated as authentic and not tampered with. Some embodiments can allow the receiving system to validate the public key, e.g., by examining a certificate available from an appropriate authority. In other embodiments, other signature validation can be used. For example, a watermark or other type of signature can be provided in the contributions, and if a valid watermark is detected, then the contributions have been validated. In some embodiments, the system can also determine whether the received contributions are validly associated with the received content. For example, an associated key to decode the contributions can be included with the content such that the system knows that the content is associated with the contributions if the content's key validly decodes the encoded contributions. In another example, a hash value from hashing both the content and the contributions can be provided with the uploaded content and/or contributions, and this hash value can be compared to a hash now performed by the receiving network system to validate that the content is associated with the correct contributions.

If the content and previous contributions are being re-uploaded at a different network system than the network system at which the contributions were created, then the different network system can choose to honor the received contributions by using a standardized decoding or decrypting method to validate the contributions. Some network systems may not be compatible with the separate contributions or the decoding, and would not validate the contributions in block 408. In other embodiments, no validation is performed and the contributions uploaded with content are always accepted. In such an embodiment, the uploading user can edit or tailor the contributions if desired, such as removing one or more of the contributions from a contribution packet.

In block 410, the process checks whether the cryptographic signature of the previous contributions is validated. If so, then in block 411 the contributions are applied to the uploaded content. For example, the contributions are extracted and/or added to the content such that contributions will be displayed with or near the content, and some contributions such as edits are performed on the content. The process then continues to block 424 to store and publish the content, as described below.

If the cryptographic signature is not validated in block 410, then in block 412 the re-uploaded content is stored and/or published on the receiving network system, without adding any of the previous contributions from the previous publication of the content. Any received contributions can be ignored or deleted. For example, the content can be shared with one or more other users on the social network system, who can then access the content and add new contributions to the content if allowed by the controlling user. The process is then complete.

If in block 404 no contributions were uploaded in addition to the obtained content, then the system can check to see if contributions are stored in an archive accessible to the network system. In block 414, the system creates a new fingerprint from the uploaded content. The new fingerprint is created using the same method used to create fingerprints on the system that archives user contributions, for example as described above for block 314 of FIG. 3. For example, a hash value of the content can be determined using a hash function, or a watermark or characteristics can be extracted from the uploaded content by using known techniques.

In block 416, the new fingerprint is compared to old fingerprints that have been stored by the network system for previously-downloaded and/or removed content. For example, the old fingerprints can be stored in a database, table, or other data structure facilitating comparisons to the new fingerprint. These old fingerprints were previously created based on content that had contributions previously published on the network system. In some embodiments, some or all of the old fingerprints may have been received by the network system from a different network system that generated or otherwise obtained the fingerprints from content and/or contributions that had been downloaded or removed from a different network system. For example, such fingerprints may have been sent to the receiving network system over a network 130 or by other type of transfer.

In some embodiments, the receiving network system can access and retrieve old fingerprints stored by a different network system or stored by a separate server, client, or storage device accessible over a network or communication channel. For example, a network-accessible repository can be maintained to store old fingerprints identifying content that has been removed from any of multiple different connected network systems. The receiving network system can access this repository to examine or search old fingerprints to compare with the new fingerprint. The repository can also store archived contributions that were previously added to the removed content when it was shared, such that any of these contributions can be retrieved by the receiving network system if appropriate (e.g., in block 422, described below).

In any of the embodiments in which old fingerprints, content and previous contributions can be obtained from external sources such as previous different network systems or storage repositories, the method can require permission from the previous network system that provided the content and contributions to be able to use the previous user contributions on the receiving network system. Such permission can be implemented similarly to the permissions described above with reference to block 406.

Some embodiments can implement the comparison of the new fingerprint to the old fingerprints by checking records created when the old fingerprints were created, such as in some implementations of the record described above for block 316 of FIG. 3. For example, each such record can refer to an old fingerprint which is compared to the new fingerprint.

In block 418, the system checks whether there is a match between the new fingerprint and any of the old fingerprints stored or accessed by the network system. If there is no match, then there are no accessible previous contributions that can be associated to this content. Thus, in next block 412, the uploaded content is stored and/or shared on the receiving network system without any previous user contributions from a previous publication. The process is then complete.

If there is a match of fingerprints in block 418, then stored previous contributions have been found to match the uploaded content. In block 420 the system checks whether the user has elected to apply any of the matched contributions. For example, in some embodiments the system can present a prompt providing options as to how the user wishes to proceed. Such options can include asking the user if he or she wants to add all the contributions, and/or displaying the contributions individually and allowing the user to select particular contributions to add. If the user does not want to add any of the previous contributions on the receiving network system, then in block 418 the uploaded content is stored and/or published on the receiving network system without any previous user contributions, and the process is complete. Some embodiments may prevent the user from selecting just a portion of the contributions, such that all or none of the contributions are used on the network system.

If the user has selected to add one or more of the previous contributions, then in block 422 the selected previous contributions are retrieved and applied to the uploaded content. For example, in some embodiments a record may have been created and stored with or linked to the matched fingerprint as in some embodiments described above for block 316 of FIG. 3. The record can associate the matched fingerprint with the contributions that are associated with the content represented by that fingerprint. This allows the system to easily find the selected contributions associated with the matched old fingerprint. The selected, matched contributions are then applied to the uploaded content. For example, the contributions are added to the content such that comments and ratings will be displayed with or near the content, and other contributions such as edits are applied to the content.

In block 424, the re-uploaded content and the selected previous contributions are stored and/or published by the social network system as content which can be manipulated by the controlling user. For example, the controlling user can publish the content and the previous contributions to other users of the network system. Other users can then add additional contributions which add to the previous contributions. After block 424, the process is complete.

It should be noted that the blocks described in the methods of FIGS. 3 and 4 can be performed in a different order than shown and/or simultaneously (partially or completely) with other blocks, where appropriate. In some embodiments, blocks can occur multiple times, in a different order, and/or at different times in the method.

In other embodiments, variations of one or more above features can be used. For example, a variety of methods or structures can be used to associate and store fingerprints with user contributions or content. Other methods can be used to verify that uploaded content is correctly associated with received user contributions. In some other embodiments, one or more of the client devices can perform one or more functions of the server, instead of or in addition to the server performing those functions.

Figure 5:
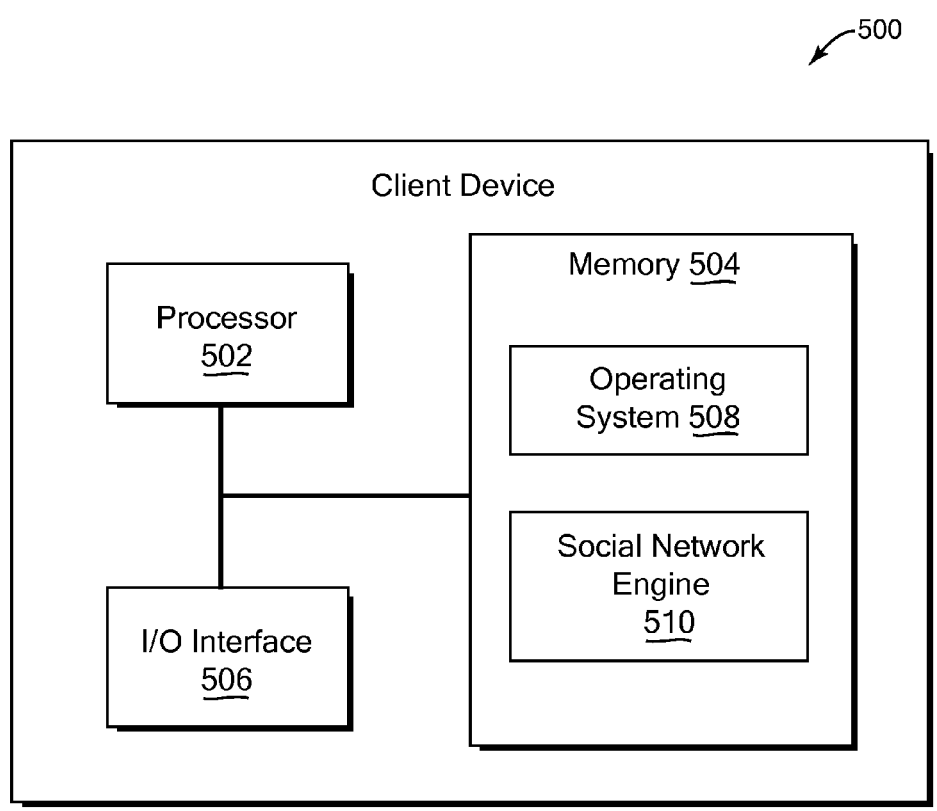
FIG. 5 is a block diagram of an example server device which may be used for one or more embodiments described herein.

FIG. 5 is a block diagram of an example server device 500, which may be used to implement some embodiments described herein. For example, server device 500 may be used to implement server device 104 of FIG. 1, and perform appropriate method embodiments described herein. Server device 500 can be any suitable computer system, server, or other electronic or hardware device. For example, the server device 500 can be a mainframe computer, desktop computer, workstation, portable computer, or electronic device (portable device, cell phone, smart phone, tablet computer, TV set top box, personal digital assistant (PDA), media player, game device, etc.). In some embodiments, server device 500 includes a processor 502, a memory 504, and input/output (I/O) interface 506.

Processor 502 can be one or more processors or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508 and a social network engine 510. In some embodiments, the social network engine 510 can include instructions that enable processor 502 to perform the content and user contribution functions described herein, e.g., some or all of the method of FIGS. 3 and/or 4. Any of the software in memory 504 can alternatively be stored on any other suitable storage location or computer-readable medium. In addition, memory 504 (and/or other connected storage device(s)) can store settings, content, user contributions, and other data used in the features described herein. Memory 504 and any other type of storage (magnetic disk, optical disk, magnetic tape, or other tangible media) can be considered "storage devices."

I/O interface 506 can provide functions to enable interfacing the server device 500 with other systems and devices. For example, network communication devices, storage devices such as memory and/or database 106, and input/output devices can communicate via interface 506. In some embodiments, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 5 shows one block for each of processor 502, memory 504, I/O interface 506, and software blocks 508 and 510. These blocks may represent one or more processors or processing circuitries, operating systems, memories, I/O interfaces, applications, and/or software modules. In other embodiments, server device 500 may not have all of the components shown and/or may have other elements including other types of elements instead of, or in addition to, those shown herein. While system 102 is described as performing steps as described in some embodiments herein, any suitable component or combination of components of system 102 or similar system, or any suitable processor or processors associated with such a system, may perform the steps described.

A client device can also be used with features described herein, such as client devices 120-126 shown in FIG. 1. Example client devices can include some similar components as the server device 500, such as processor(s) 502, memory 504, and I/O interface 506. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, and a display device for outputting images or video. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some embodiments can provide an audio output device, such as voice output or synthesis that speaks text in ad/or describing the settings and interface interactions.

As indicated above, embodiments enable user contributions previously made to shared content to be re-used for later publications of the same content. In some embodiments, content can be removed from one social networking system and re-uploaded to a completely different social networking system and can retain the user contributions made at the previous system. Permissions can allow the participating social network systems to control the distribution of user contributions. These features enable a user to retain interesting and valuable user contributions to content that is moved or deleted on same or different systems.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art. Any suitable programming language and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some embodiments, multiple steps or blocks shown as sequential in this specification may be performed at the same time.

What is claimed is:

1. A method for providing user contributions for shared content on a network, the method comprising:
   receiving uploaded content from a first user at a social network system for publication to one or more users of the social network system, wherein the uploaded content is not currently being published on the social network system;
   obtaining one or more stored previous user contributions associated with and previously applied to the uploaded content, wherein the one or more previous user contributions are different than the uploaded content and include at least one of:
      one or more user ratings of the content,
      one or more user comments associated with the content, and
      one or more tags associated with the content,
   wherein the one or more previous user contributions were contributed by one or more other users of a different social network system, and wherein the one or more user contributions were previously published with the uploaded content to one or more users on the different social network system;
   verifying that the previous user contributions are authentically and correctly associated with the uploaded content and have not been altered since their previous publication; and
   publishing the uploaded content and the previous user contributions applied to the uploaded content on the social networking system, wherein the uploaded content and the user contributions are accessible by the one or more users of the social network system.

2. A method for providing user contributions for shared content on a network, the method comprising:
   receiving content at a network system for publication on the network system, wherein the content is not currently being published on the network system;
   receiving an election from the user electing that one or more previous user contributions are to be published with the content, wherein the one or more previous user contributions are different than the content, are associated with the content, and were contributed by one or more other users of a previous network system and previously published with the content on the previous network system;

obtaining the one or more previous user contributions;

verifying that the previous user contributions are authentically and correctly associated with the content;

publishing the content and the one or more previous user contributions with the content on the network system to allow access to the content and the one or more previous user contributions by one or more users of the network system.

3. The method of claim 2 wherein the previous network system is a different network system than the network system.

4. The method of claim 2 wherein the previous network system is the same network system as the network system, wherein the content was previously removed from the network system before the receiving of the content.

5. The method of claim 2 wherein the content is received as an upload of the content at the network system from a user, and wherein the obtaining the one or more previous user contributions includes receiving the previous user contributions at the network system in a contribution packet of information.

6. The method of claim 5 wherein the contribution packet is embedded in the uploaded content.

7. The method of claim 5 wherein the contribution packet is signed with a cryptographic signature, and further comprising validating the cryptographic signature before publishing the user contributions, wherein if the cryptographic signature is not valid, the content is published and the user contributions are not published.

8. The method of claim 2 wherein the obtaining the one or more previous user contributions includes retrieving the one or more previous user contributions from storage accessible to the network system, wherein the one or more previous user contributions were previously archived by the previous network system in the storage before the content was removed from the previous network system.

9. The method of claim 2 further comprising checking for at least one permission associated with the one or more previous user contributions from the previous network system to allow the network system to publish the one or more previous user contributions.

10. The method of claim 2 wherein the content is uploaded to the network system, and wherein determining that the uploaded content is associated with one or more stored previous user contributions includes:

creating a new fingerprint derived from the uploaded content;

checking whether the new fingerprint matches one or more old fingerprints derived from previous content that was previously published; and determining that one of the one or more old fingerprints matches the new fingerprint, wherein the matched old fingerprint is associated with the stored previous user contributions.

11. The method of claim 10 wherein the new fingerprint is based on one or more characteristics of the uploaded content, and wherein the one or more old fingerprints are each based on one or more characteristics of the associated previous content.

12. The method of claim 10 wherein the new fingerprint is based on a hash of at least a portion of the uploaded content, and wherein the one or more old fingerprints are each based on an associated hash of at least a portion of the associated previous content.

13. The method of claim 2 wherein the one or more previous user contributions include at least one of: at one or more user ratings of the content, one or more user comments associated with the content, and one or more tags associated with the content.

14. The method of claim 2 further comprising, prior to the receiving of content at the network system:

receiving at the previous network system a request from a user to download the content published at the previous network system;

cryptographically signing the previous user contributions stored at the previous network system; and sending the content and the previous user contributions to a client device of the user.

15. A system for providing user contributions for shared content on a network, the system comprising:

a storage device; and at least one processor accessing the storage device and operative to perform operations comprising:

receiving content at a network system for publication on the network system, wherein the content is not currently being published on the network system;

determining that the content is associated with one or more stored previous user contributions that are different than the content and were contributed by one or more users of a previous network system and previously published with the content on the previous network system;

obtaining the one or more previous user contributions;

verifying that the previous user contributions are authentically associated with the content to verify that the previous user contributions properly apply to the uploaded content; and publishing the content and the one or more previous user contributions with the content on the network system to allow access to the content and the user contributions by one or more users of the network system.

16. The system of claim 15 wherein the obtaining of the one or more previous user contributions includes receiving the previous user contributions at the network system in a contribution packet of information that has been uploaded by the user with an upload of the content to the network system.

17. The system of claim 16 wherein the contribution packet is signed with a cryptographic signature, and further comprising validating the cryptographic signature before publishing the user contributions, wherein the user contributions are not published if the cryptographic signature is not valid.

18. The system of claim 15 wherein the content is uploaded to the network system, and wherein determining that the uploaded content is associated with one or more stored previous user contributions includes:

creating a new fingerprint derived from the uploaded content;

checking whether the new fingerprint matches one or more old fingerprints derived from previous content that was previously published; and determining that one of the one or more old fingerprints matches the new fingerprint, wherein the matched old fingerprint is associated with the stored previous user contributions.

* * * * *